United States Patent [19]

Kamata

[11] 3,723,711

[45] Mar. 27, 1973

[54] METER PARTICULARLY MEASURED QUANTITY READ-OUT DEVICE THEREFOR

[75] Inventor: Takeshi Kamata, Kahaku-ku, Yokohama, Japan

[73] Assignee: Ricoh Co., Ltd., Tokyo, Japan

[22] Filed: May 20, 1971

[21] Appl. No.: 145,252

[30] Foreign Application Priority Data

May 25, 1970 Japan ...............................45/44010

[52] U.S. Cl. ......235/92 EA, 235/92 AC, 235/92 FL, 235/92 R, 340/347 P

[51] Int. Cl. ............................................G06m 1/276

[58] Field of Search....235/92 AC, 92 EA, 92 EL, 92 FL,'235/92 TC, 92 C; 340/347 P, 379

[56] References Cited

UNITED STATES PATENTS

| | | | |
|---|---|---|---|
| 3,585,370 | 6/1971 | Kubler | 235/92 C |
| 2,094,122 | 9/1937 | Haselton | 235/92 EA |
| 3,624,361 | 11/1971 | Rossi et al. | 235/92 AC |
| 3,275,807 | 9/1966 | Harper | 235/92 EA |
| 3,387,267 | 6/1968 | Little | 340/347 P |
| 2,749,397 | 6/1956 | Brown | 340/347 P |
| 2,733,008 | 1/1956 | D'Andrea et al. | 340/347 P |
| 3,588,886 | 6/1971 | Lee | 340/347 P |

*Primary Examiner*—Daryl W. Cook
*Assistant Examiner*—Joseph M. Thesz, Jr.
*Attorney*—Robert S. Dunham, Henry T. Burke, P. E. Henninger, Lester W. Clark, Gerlad W. Griffin, Thomas F. Moran, Howard J. Churchill, R. Bradlee Boal, Christopher C. Dunham and Thomas P. Dowd

[57] ABSTRACT

A measured quantity readout device for use with flowmeters and the like comprising means for producing electrical signals indicative of the measurement of a predetermined quantity of flow; a motor adapted to be actuated by the electrical signals and driving a digit wheel which is provided with coded elements on its periphery for indicating the quantity of flow; two sets of contacts mounted on respective support plates and urged toward each other by a spring such that each engages the digit wheel in diametrically opposed positions on its outer periphery to sense the presence or absence of the coded elements; output lines for reading out signals indicating whether either or both of the sets of contacts are closed by the sensing of a coded element; and means operated by the motor for urging the sets of contacts out of engagement with the digit wheel to render the wheel free to be driven by the motor during its actuation by the electrical signals. Alternate embodiments of the latter means are disclosed and the details of one form of signal-producing means.

10 Claims, 15 Drawing Figures

INVENTOR.
TAKESHI KAMATA
BY
ATTORNEY
Henry T. Burke

INVENTOR
TAKESHI KAMATA
BY
ATTORNEY

| Figure / Row | 0 | 1 | 2 | 3 | 4 | 5 | 6 | 7 | 8 | 9 |
|---|---|---|---|---|---|---|---|---|---|---|
| a | | ○ | | | ○ | ○ | | | ○ | |
| b | ○ | ○ | ○ | | | | | | | |
| c | | | ○ | ○ | ○ | | | | | |

| Figure / Row | 0 | 1 | 2 | 3 | 4 | 5 | 6 | 7 | 8 | 9 |
|---|---|---|---|---|---|---|---|---|---|---|
| a | | ○ | | | ○ | ○ | | | ○ | |
| b | ○ | ○ | ○ | | | | | | | |
| c | | | ○ | ○ | ○ | | | | | |
| a' | ○ | | | ○ | | | ○ | | | ○ |
| b' | | | | | | ○ | ○ | ○ | | |
| c' | | | | | | | | ○ | ○ | ○ |

INVENTOR.
TAKESHI KAMATA
BY
ATTORNEY

INVENTOR
TAKESHI KAMATA
BY
ATTORNEY

INVENTOR
TAKESHI KAMATA
BY
ATTORNEY

INVENTOR
TAKESHI KAMATA
BY
ATTORNEY

METER PARTICULARLY MEASURED QUANTITY READ-OUT DEVICE THEREFOR

BACKGROUND OF THE INVENTION

This invention relates to meters for measuring the consumption of electrical power or a quantity of fluid, such as gas, water, chemicals and the like, and more particularly to a measured quantity read-out device for such meters.

In keeping records of consumed quantities of electricity, gas and water, it has hitherto been the usual practice for a meter inspector to make a round of calls on customers every month for visually reading the values indicated by the indicator of each meter counter. The inspector manually enters the read value in a specified form. This process is time consuming and requires a lot of manual and visual attention when a large number of meters have to be inspected. An error may occur in reading the indicated value, particularly when the inspector is tired at the end of a day's work or when the weather is nasty.

These meters indicate the time integration of power or quantity consumed over various periods of time. In meters of this type, the difference between the indicated value for a certain month and the indicated value for the previous month is determined for calculating the charge for the particular month. This is a troublesome operation which sometimes involves errors in the calculation.

To obviate the disadvantages of the conventional process somewhat, a system has been previously developed in which the value registered in a meter counter is read and applied to a computer wherein the information is retained and at the same time the difference between the registered value for the month of interest and the corresponding value for the previous month may be calculated, so that the charge for the particular month of interest can be automatically calculated based on the difference in registered values. This system requires the preparation of a punch tape or the like to be used as an input to the computer but it is troublesome to prepare such tapes based on the figures read and manually entered in the forms by the meter inspectors.

Flowmeters with remote indicators are also known which comprise a signal producing section for producing a pulse each time a predetermined flow quantity passes through the meter, and an indication section provided with a motor which is actuated each time a pulse is produced by the signal producing section for intermittently moving a digit wheel step by step. Such a meter is disclosed in Japanese Utility Model Publication No. 1320/68.

The present invention involves a meter of this type and provides in addition a measured quantity read-out device therefor, which uses a motor adapted to be driven by a pulse produced each time a predetermined quantity of fluid passes through the meter, and which obviates the aforementioned disadvantages of conventional meter counters permitting the reading out of indicated values without committing an error and in a manner such that the preparation of a tape for computers is facilitated.

SUMMARY OF THE INVENTION

The present invention contemplates the provision of a meter for measuring electrical power or a quantity of fluid including: a signal producing section adapted to produce a signal for each predetermined quantity of electricity consumed or fluid passed; a motor adapted to be rotated by the signal; at least one digit wheel provided on its outer periphery with a plurality of rows of indicator elements for indicating the digits thereon in code; detection means adapted to cooperate with the indicator elements and detect the presence or absence thereof; contacts provided in said detection means for producing and communicating binary-coded output signals to an outside indication means; and means operated by the motor for moving away the detection means from the digit wheel so as to render the digit wheel free to be rotated by the motor.

BRIEF DESCRIPTION OF THE DRAWINGS

Additional features and advantages of this invention will become evident from the description set forth hereinafter when considered in conjunction with the accompanying drawings, in which.

DETAILED DESCRIPTION OF THE INVENTION

Figure 1:
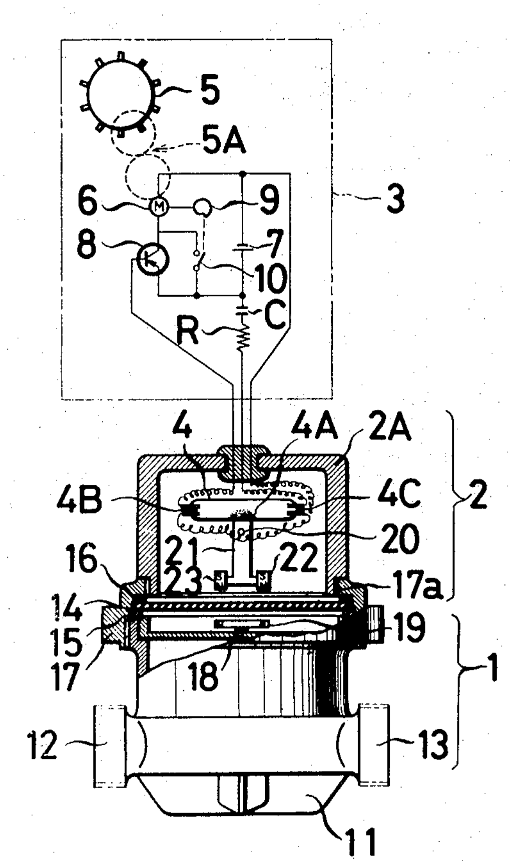
FIG. 1 is a semi-diagrammatic view illustrating a meter and read-out device constructed in accordance with the present invention.

A meter in accordance with the present invention is shown in FIG. 1 and comprises a converter section 1 for converting the quantity of fluid to be measured, which flows between an inlet 12 connected to a fluid line and an exit 13, into a quantity of rotation; a signal producing section 2 for producing a signal proportional to the quantity of rotation obtained by conversion in section 1; and an indication section 3 for indicating the signal produced by the signal producing section 2 in a digital quantity.

The converter section 1 more particularly includes a lower outer casing 11 for housing therein a vane wheel and a speed reducing gear train (not shown). The gear train is adapted to reduce the rate of rotation of a shaft 18 which is connected to the vane wheel through the gear train. The shaft 18 supports at its upper end a rotary permanent magnet 19 provided with magnetic poles at opposite ends thereof. The rotary permanent magnet 19 thus rotates in proportion to the rotation of the vane wheel, and hence at the flow rate of the fluid. A glass plate 14 is secured to the lower casing 11 by means of an upper outer casing 17 through packings 15 and 16.

The signal producing section 2 has a casting 2A, with a built-in mercury switch 4 therein, threadably connected by a threaded portion 17*a* to the upper portion of the upper outer casing 17. The mercury switch 4 is secured to the upper portion of a holder 21, which is supported for free pivotal motion about a pivot 20, and contains therein contacts 4B and 4C for cooperating with the supply of mercury 4A. Mounted at the lower portion of the holder 21 are two upper side magnets 22 and 23 which are disposed in positions opposite the magnetic poles of the aforementioned rotary magnet 19 and which are provided with N- and S-poles respectively.

The indicator section 3 comprises a digit wheel 5; a motor 6 for driving the digit wheel 5; a power source 7; a transistor 8; a cam 9 mounted on the shaft of the motor 6; a switch 10 adapted to be actuated by the cam 9; a resistor R; and a capacitor C.

When the vane wheel disposed in the passageway of fluid rotates and the rotary magnet 19 moves to the position shown in FIG. 1, the N-pole of the rotary magnet 19 and the N-pole of the upper side magnet 23 repel each other while the S-pole of the rotary magnet 19 and the N-pole of the upper side magnet 22 attract each other. As a result, the holder 21 slightly moves in pivotal motion in a clockwise direction about the pivot 20, thereby causing the mercury switch 4 to tilt slightly to the right. This causes the supply of mercury 4A within the mercury switch 4 to move to the right so as to close the contact 4C. Accordingly, the capacitor C is charged to a degree corresponding to the voltage of the power source 7 through the resistor R.

When the vane wheel further rotates and the rotary permanent magnet 19 makes one-half revolution from the indicated position, the positions of the north pole and the south pole are reversed, so that the forces acting on the upper side magnets 22 and 23 are also reversed. This causes the holder to move in pivotal motion in an anticlockwise direction about the pivot 20, thereby closing the contact 4B. The electric charge stored in the capacitor C is thus discharged in the form of a base current of the transistor 8, and the resulting collector current thereof starts the motor 6, so that the motor 6 tends to rotate while the base current, whose quantity is determined by the values of the resistor R and capacitor C, is in existence.

However, since the motor 6 rotates the cam 9 which actuates the switch 10 connected in parallel with the transistor 8, when the cam 9 slightly rotates the switch 10 is closed, so that the motor 6 will continue to rotate even if the base current due to the discharge of the capacitor C ceases to exist and the transistor 8 is turned off.

Figures 2A, 2B, 2C, 2D:
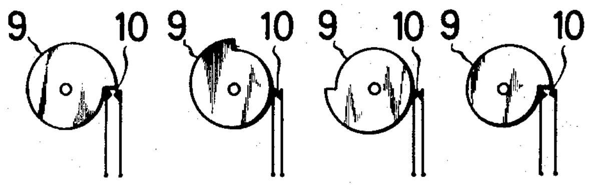
FIGS. 2(A) to 2(D) are series of views illustrating the manner of operation of a cam for transmitting a signal to, and determining the stop position of, the digit wheel-driving motor in the read-out device of FIG. 1.

FIG. 2 shows the manner of operation of the cam 9 and switch 10. When the cam 9 and the switch 10 are as shown in FIG. 2 (A), the motor remains inoperative. FIG. 2 (B) shows the switch 10 being closed as the motor 6 is started by the collector current of the transistor 8. When the cam 9 and switch 10 are in positions shown in FIG. 2 (C), the motor 6 continues to rotate. The motor 6 continues its rotation even if the transistor 8 is turned off, when the cam 9 is disposed in the positions shown in FIGS. 2 (B) and 2 (C). FIG. 2 (D) shows the switch 10 being opened again after the cam 9 has made one complete revolution, whereupon motor 6 becomes inoperative. Thus, in one cycle of operation, as shown in FIGS. 2 (A) to 2 (D), the digit wheel 5 is moved a predetermined distance by the motor 6 through a transmission 5A.

Figure 3:
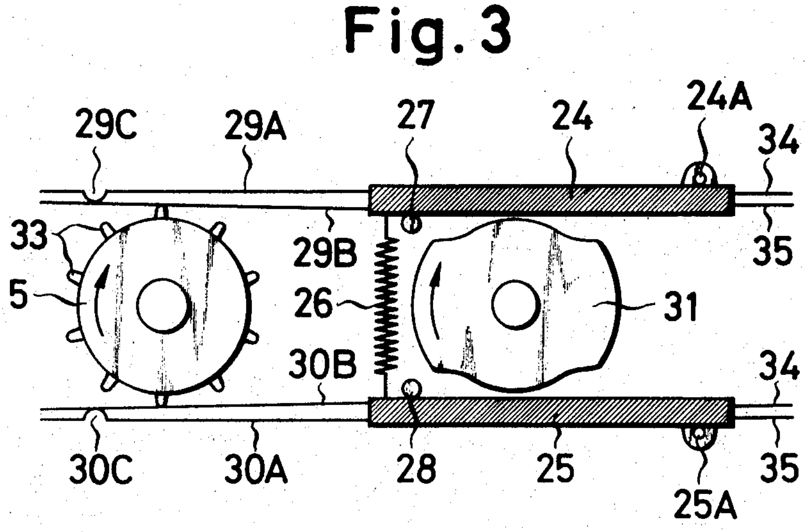
FIG. 3 and FIG. 4 are detailed views illustrating the operating principles of the read-out device according to this invention.
Figure 4:
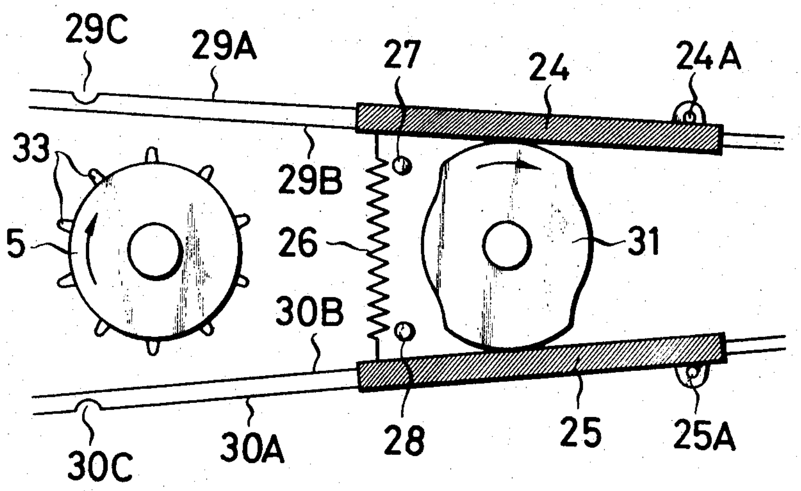

The construction of a preferred form of read-out device in accordance with the present invention is shown in detail in FIGS. 3 and 4. Two support plates 24 and 25 are disposed for pivotal motion about pivots 24A and 25A respectively. The support plates 24 and 25 are moved toward each other by the biasing force of a tension spring 26. Stoppers 27 and 28 are provided for the support plates 24 and 25 respectively. A set of contact bars 29A and 29B extend from the support plate 24 while another set of contact bars 30A and 30B extend from the support plate 25. The two sets of contact bars 29A and 29B and 30A and 30B are provided with contacts 29C and 30C, respectively. A cam 31 is disposed between the two support plates 24 and 25 while the digit wheel 5 is disposed between the two sets of contact bars. Although only two sets of contact bars are shown in FIG. 3 and 4, it will be seen by referring to FIGS. 5 and 8 that the number of sets of contact bars disposed above and below the digit wheel 5, will depend on the number of rows of projecting indicator or control elements 33 on the digit wheel, with one upper set of contact bars and one lower set of contact bars being aligned with each row of projecting control elements 33 provided on the outer periphery of the digit wheel. The control elements 33 are arranged to appropriately indicate the positions of the numbers or other indicia on the periphery of the digit wheel.

In operation, when the minor portion of the cam 31 is disposed against the two support plates 24 and 25 as shown in FIG. 3, the two support plates 24 and 25 abut against the respective stoppers 27 and 28 by virtue of the biasing force of the spring 26. As a result, the projecting control elements 33 provided on the outer periphery of the digit wheel 5 are brought into contact with the contact bars 29B and 30B which are resiliently movable, so as to push and move them outwardly, thereby closing the contacts 29C and 30C. When there is no projecting control element in the position on the digit wheel in which any one set of contact bars are disposed, the contact of such set of contact bars is not closed. Thus, an On or Off signal is transmitted through conductors 34 to an external line, whose input conductors are designated 35.

When the major diameter portion of the cam 31 is disposed against the two support plates 24 and 25 as shown in FIG. 4, the two support plates are pushed by the major diameter portions of the cam and move in pivotal motion about the pivots 24A and 25A against the biasing force of the spring 26. This causes the sets of contact bars 29A and 29B and 30A and 30B to move away from the projecting control elements or pins 33 disposed on the outer periphery of the digit wheel 5. Accordingly, the contacts 29C and 30C are opened irrespective of whether the projecting control pins are disposed in positions corresponding to the positions of the contact bars 29B and 30B and the digit wheel 5 can freely rotate. The digit wheel may then advance to another selected indicia position in response to a quantity signal from sections 1 and 2.

Figures 5, 6, 7:
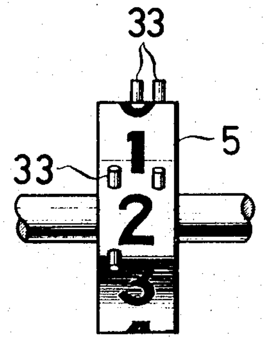
FIG. 5 is a front view of one form of digit wheel used in this invention.
FIG. 6 and FIG. 7 are tables in explanation of the codes used in producing an output signal from the digit wheel of FIG. 5.

The digit wheel 5 has the projecting control elements or indicator pins 33 attached to its outer periphery as shown in FIG. 5 so as to indicate the numbers on the wheel in code. FIG. 6 shows the relation between various numbers to be indicated and the number and position of the pins. In this case, the pins are arranged in three rows *a*, *b* and *c*, but unlike the conventional system, the numbers 0 to 9 are represented not by three information bits but rather by six bits by sensing the pins disposed in two positions diametrically opposed to each other on the outer periphery of the digit wheel 5.

More particularly, as explained with reference to FIGS. 3 and 4, the movable contacts 29C and 30C of the movable contact bars 29A and 29B and 30A and 30B simultaneously detect the presence or absence of the pins 33 in positions on the digit wheel 4 which correspond to the positions of the contact bars 29B and 30B respectively, and transmit the results in the form of an ON or OFF signal to an external contact, and hence to a data collector, through the conductors 34. Thus, the number or figure appearing at the appropriate position on each digit wheel is indicated by the cooperation of signals detected by the movable contacts 29C and 30C. FIG. 7 shows the positions of the pins indicating the numbers as detected by the movable contacts 29C and 30C. The pins disposed in positions diametrically opposed to each other on the outer periphery of the digit wheel 5 are arranged in corresponding groups adjacent the digits 0 and 5, 1 and 6, 2 and 7, 3 and 8 and 4 and 9 respectively as shown in FIG. 6. Accordingly, if the pin of the 0 group shown in FIG. 6 is disposed in a position corresponding to the position of the movable contact bar 29B, the pin of the 5 group shown in FIG. 6 will be disposed in a position corresponding to the movable contact bar 30B. This relation is shown in FIG. 7, with the pins being disposed in rows *b* and *a'* respectively to represent the number 0.

When the pins of the 1 group shown in FIG. 6 are disposed in a position corresponding to the position of the movable contact bar 29B, the pin of the 6 group shown in FIG. 6 is disposed in a position corresponding to the position of the movable contact 30B. This relation is shown in the 1 group of FIG. 7. Since there is no pin in the 6 group of FIG. 6, the pins are disposed only in rows *a* and *b*, thereby representing the number 1. The numbers 2 to 9 can be represented by the code in like manner.

The two sets of movable contact bars 29 and 30 shown in FIGS. 3 and 4 are provided for each of the rows *a*, *b* and *c* of pins adjacent a particular number as aforementioned. Therefore, when the measured quantity is indicated by a number comprising three digits, for example, the meter would be provided with three digit wheels and each digit wheel would be provided with three upper and three lower sets of movable contact bars, so that the meter will have 18 sets of movable contact bars in total.

Figure 8:
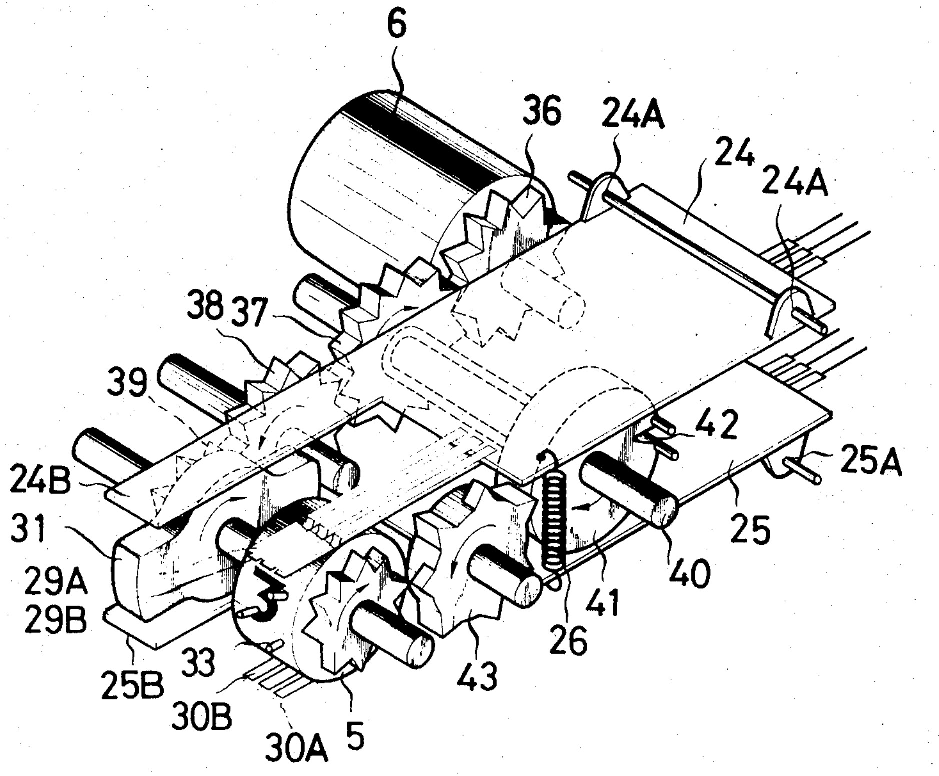
FIG. 8 is a detailed perspective view of the preferred embodiment of read-out device according to this invention.

A preferred embodiment of read-out device according to this invention is shown in greater detail in FIG. 8 in a somewhat modified form from that shown in FIG. 3. More specifically, the cam 31 is disposed adjacent to and on the same shaft as the digit wheel 5. As shown, the minor diameter portion of the cam 31 is disposed against extensions 24B and 25B of the support plates 24 and 25 respectively, so that the projecting control pins 33 disposed in the upper portion and lower portion of the outer periphery of the digit wheel 5 move the sets of contact bars attached to the digit wheel upwardly and downwardly respectively as explained with reference to FIG. 3. Therefore, if a data collector is connected to the meter, for example, the presence or absence of the projecting control pins in the upper and lower portions of the outer periphery of the digit wheel will be transmitted in the form of ON and OFF signals to the register section of the data collector. The signals may be registered in a tape in the form of holes or marks.

In accordance with the operation as explained with reference to FIGS. 1 and 2, a pulse is transmitted from the signal producing section 2 to the indication section 3 each time a predetermined quantity of fluid has passed through the meter, so as to rotate the motor 6. The rotation of the motor 6 causes the cam 31, secured to a gear 39, to rotate through a gear 36 secured to the motor shaft, a main gear 37, an intermediate gear 38 and the gear 39. This brings the major diameter portion of the cam 31 into engagement with the extensions 24B and 25B of the two support plates 24 and 25 respectively so as to move the latter outwardly, thereby releasing the digit wheel 5 from engagement with the sets of contact bars and rendering it free for rotation as explained with reference to FIG. 4.

It will be seen that the rotation of the main gear 37 also causes a count gear 41 to rotate through a shaft 40, so that a recess 42 formed in the outer periphery of the count gear 41 moves a feed wheel 43 two pitches. The digit wheel 5 which is now free for rotation thus advances one step. This digit wheel step-by-step advancing mechanism is known in the art and need not be described in further detail herein.

After the digit wheel 5 has moved forwardly one step in this way, the cam 31 further continues to rotate until its minor diameter portion is positioned against the extensions 24B and 25B of the two support plates 24 and 25 respectively whereupon the contact bars are brought into engagement with the control pins 33 on the digit wheel 5. At this time, switch 10 is opened or a suitable end pulse may be produced so as to shut off the motor 6.

When the meter is constructed such that it stores a number having three digits, two more digit wheels have only to be arranged coaxially with the digit wheel 5 and the adjacent digit wheels operatively coupled to one another by feed wheels. Two sets of contact bars are provided for each row of control elements 33 of the additional digit wheels. In this case, the cam 31 and support plates 24 and 25 may be used commonly for all three digit wheels.

Figure 9:
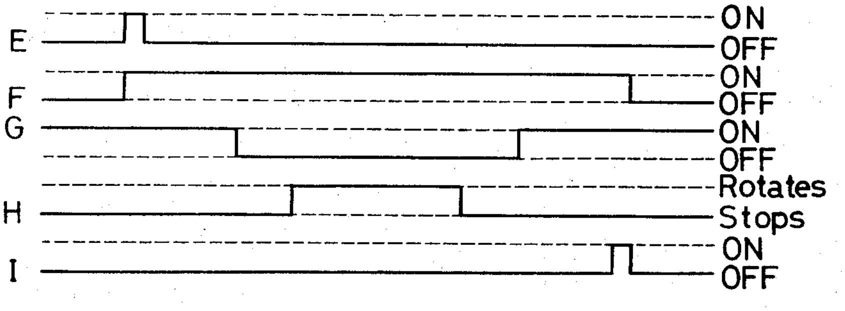
FIG. 9 is a time chart indicating the timing sequence of the operation of the various operating elements.

The sequence of operations of the various components may be better understood with reference to FIG. 9 which shows a time chart wherein E denotes an input pulse from the signal producing sections; F denotes the rotation of the motor 6; G denotes the opening and closing of the contacts 29C and 30C; H denotes the rotation of the digit wheel 5; and I denotes the operation timing of an end pulse. Upon receiving an input pulse (E), the motor begins to rotate (F). As the support plates are moved apart from each other by the cam, the contacts of the two sets of contact bars are opened (G). The digit wheel which is rendered free to rotate as the support plates are moved apart from each other begins to rotate (H), and further rotation of the cam results in the support plates moving toward each other into their original positions, so that the contacts of the two sets of contact bars are closed again (G). Finally, an end pulse is produced (I) and the motor is shut off (F).

Figure 10:
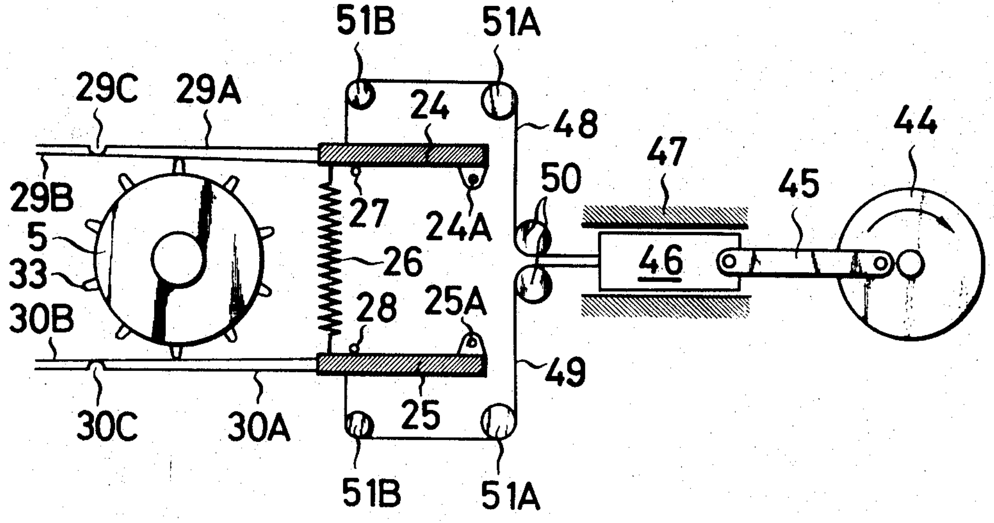
FIG. 10 and FIG. 11 are detailed views illustrating another embodiment of this invention.
Figure 11:
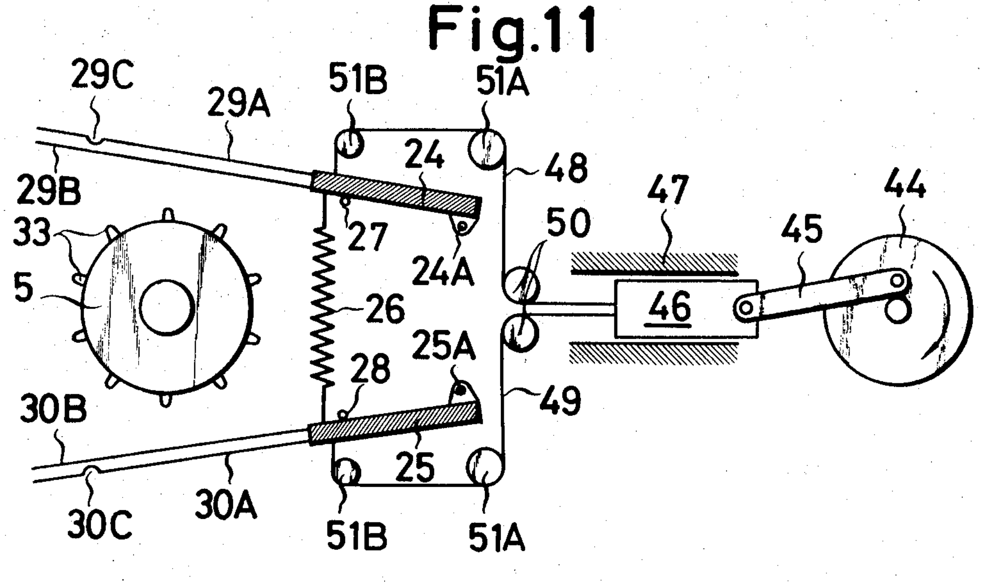

An alternate embodiment of the contact bar operating mechanism is shown in FIGS. 10 and 11, in the form of a crank mechanism which comprises a rotary member 44, operatively connected to the motor 6 of FIGS. 1 and 8 for rotation in the direction of the arrow; a connecting rod 45 connected at one end thereof to the rotary member 44; and a sliding member 46 to which the connecting rod 45 is pivotally connected at the other end thereof. The sliding member 46 is slidably mounted in a guide section 47.

Two wires 48 and 49 are connected to the opposite end of the sliding member 46 from the connecting rod 45. These wires are trained about a pair of guide pulleys 50 and two sets of pulleys 51A, 51B and secured to the two support plates 24 and 25 respectively which are disposed on opposite sides of the digit wheel 5. Otherwise, the construction of the support plates 24 and 25 is identical with that shown in FIGS. 3 and 4 in that two sets of contact bars 29A and 29B and 30A and 30B respectively extend outwardly from the support plates.

When the motor 6 rotates as a predetermined quantity of fluid has passed through the meter, the rotary member 44 coupled to the motor 6 rotates in the direction of the arrow, thereby bringing the crank mechanism to move to the position shown in FIG. 11 in which the sliding member 46 is disposed in a position which is rightwardly of the position in which it is disposed when the crank mechanism is in a position shown in FIG. 10. The rightward movement of the sliding member 46 causes, through the wires 48 and 49, the support plates 24 and 25 to move in pivotal motion about the pivots 24A and 25A respectively, with a result that the two sets of contact bars connected to the two support plates respectively are moved away from the projecting control pins 33 on the outer periphery of the digit wheel 5, thereby leaving the digit wheel 5 free to rotate (FIG. 11).

Figure 12:
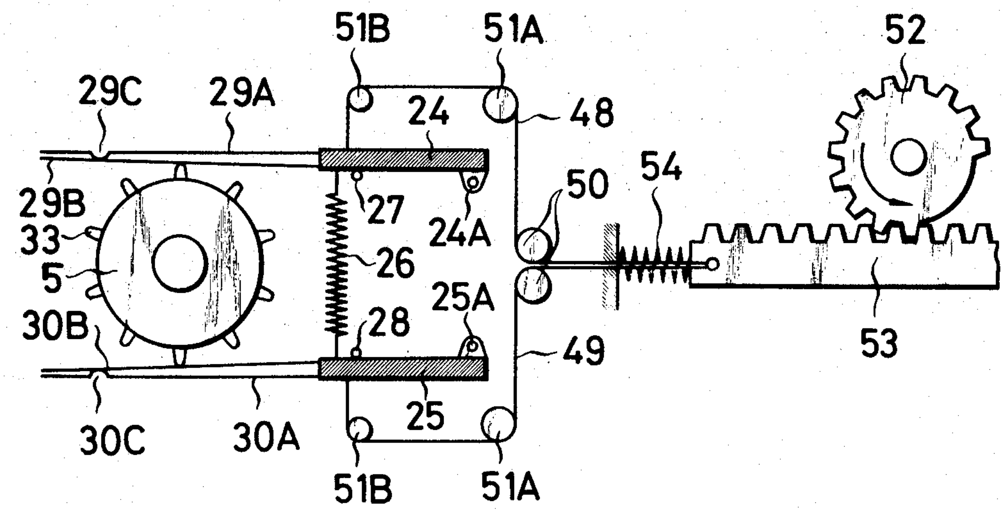
FIG. 12 is a detailed view illustrating a further alternate embodiment of this invention.

FIG. 12 shows still another alternate embodiment of this invention which uses a pinion 52 and rack 53 combination in place of the crank mechanism shown in FIGS. 10 and 11. The pinion 52 is operatively connected to the motor 6, as is the rotary member 44 of the embodiment described above, to rotate in the direction of the arrow, in this case counterclockwise. The pinion 52 has teeth over about three-fourth the entire extent of its outer periphery, the balance of the outer periphery thereof being toothless. The rack 53 is normally urged by the biasing force of a tension spring 54 to move leftwardly in FIG. 12. The two wires 48 and 49 of the previous embodiment are connected to the rack 53 and the remainder of the system is the same.

When the pinion 52 rotates in the direction of the arrow in conjunction with the motor 6, the rack 53 moves to the right in FIG. 12 against the biasing force of the tension spring 54, thereby pulling the wires 48 and 49 and rendering the digit wheel 5 free to rotate as explained with reference to the embodiment shown in FIGS. 10 and 11. When the pinion 52 has made about three-fourth revolution, the rack 53 is brought into engagement with the toothless portion of the outer periphery of the pinion 52, so that the rack 53 is restored to the original position by the biasing force of the spring 54.

From the foregoing description, it will be appreciated that the read-out device according to this invention is constructed such that the operation of at least one digit wheel and closing and opening of contacts for extracting information from the digit wheel are effected by means of one motor. This arrangement is conducive to obtaining an overall compact size in a meter and reducing cost.

Normally, the contacts for extracting information from the digit wheel are closed so as to permit extraction of information. Thus, it is possible to produce and transmit a detection pulse any time as desired for extracting the quantity of fluid measured by the meter and transferring the same to outside. On the other hand, the contacts for extracting information are opened while the digit wheel is moving step by step, so that when an attempt is made to extract information from the digit wheels from outside by means of a data collector or the like, it is not possible to attain the end because the device is not in a state fit for extraction of information. Heretofore, the step-by-step movement of the digit wheel and detection of the quantity of fluid have sometimes been effected simultaneously. In such cases, the problem of detection misoperation has often been experienced. The measured quantity read-out device according to this invention obviates this problem.

During the step-by-step movement of the digit wheel, the digit wheel can be freely rotated by the motor according to this invention. This permits the digit wheel to be rotated at low torque. Also, no significant forces are exerted on the contacts, so that the contacts are durable and have an increased service life.

Although the embodiments shown and described herein have been described as comprising detection means for detecting control pins on the outer periphery of the digit wheel which includes sets of contact bars arranged to contact the digit wheel in two diametrically opposed positions, it is to be understood that this invention is not limited to this specific form of detection means. According to this invention, sets of contact bars may be made to contact the digit wheel only in one position. If this is the case, then it is necessary to increase the number of rows of the control pins.

It is also to be understood that other indicia as well as numbers may be printed or otherwise superposed on the outer periphery of the digit wheel shown in FIGS. 5 and 8 so that any measured quantity can be seen visually from outside.

What is claimed is:

1. A measured quantity read-out device comprising:

a. a signal producing means for producing a signal indicative of the measurement of a predetermined quantity;

b. a motor adapted to be actuated in response to a signal from said signal-producing means;

c. at least one indicator wheel driven by said motor and provided on its outer periphery with elements for indicating the predetermined quantity in code;

d. detection means for cooperating with the coded elements and normally maintained in contact with the indicator wheel for detecting the presence of the coded elements on the indicator wheel, said detection means including two movable contact means engaging the indicator wheel in positions diametrically opposed to each other on the outer periphery of the indicator wheel;

e. output means connected to said detection means for producing coded output signals; and f. means operated by said motor for breaking the contact between said detection means and the indicator wheel when said motor is actuated so as to render the indicator wheel free to be rotated by said motor.

2. A measured quantity read-out device as in claim 1 wherein said detection means further comprises spring means for urging said two movable contact means toward each other and against the periphery of said indicator wheel.

3. A device as in claim 1, wherein said signal producing means comprises a power supply; a capacitor for accepting a charge from said power supply in response to the measurement of a predetermined quantity; a transistor connected to said capacitor and said motor for producing a current to actuate said motor upon the discharge of said capacitor; means for discharging said capacitor to actuate said motor in response to the measurement of a predetermined quantity; cam means rotated by said motor upon actuation; and switch means actuated by said cam means for maintaining the actuation of said motor during a portion of cam rotation.

4. A device as in claim 1, wherein said signal-producing means comprises first magnet means having north and south poles and adapted for rotation in response to the measurement of a predetermined quantity; second and third magnetic means having north and south poles and disposed in parallel, each with a like pole located respectively adjacent the north and south poles of said first magnetic means; switch means having two electrical contacts, the closing of either of which supplies a signal to said motor; pivot means having two arms, one for mounting said switch means and the other for mounting said second and third magnetic means such that rotation of said first magnet will rotate the switch means about said pivot means to close one of said contacts.

5. A device as in claim 1, wherein said coded elements comprise upstanding pins on said indicator wheel, coded in combinations in positions diametrically opposite to each other on the outer periphery of said wheel.

6. A measured quantity read-out device comprising:

a. motive means activated in response to a signal indicative of the measurement of a predetermined quantity;

b. at least one indicator wheel driven by said motive means for indicating by its movement the measurement of said predetermined quantity;

c. coded means on the outer periphery of said indicator wheel for converting the movement of said indicator wheel into a coded indication of the predetermined quantity measured;

d. detection means normally contacting said indicator wheel for sensing the presence of said coded means thereon said detection means including for each indicator wheel two movable contact means engaging the indicator wheel in positions diametrically opposed to each other on the outer periphery of the indicator wheel;

e. output means connected to said detector means for producing output signals in response to the sensing of said coded means; and f. means driven by said motive means for breaking the contact between said indicator wheel and said detection means to permit free movement of said indicator wheel during the actuation of said motive means.

7. A measured quantity read-out device as in claim 6 wherein each of said two movable contact means comprises a pivotable support plate and two contact bars on said support plate, one of said bars engaging said indicator wheel for detecting the presence of the coded elements thereon, and engaging said other bar when a coded element is detected.

8. A device as in claim 6 wherein said contact-breaking means comprises a cam rotated by said motive means and positioned between said two movable contact means; said cam having surfaces thereon for urging the contact means away from each other during a portion of its rotation.

9. A device as in claim 6 wherein said contact-breaking means comprises a crank means rotated by said motive means and means connected between said crank means and each of said two movable contact means for urging said contact means away from each other during a portion of the rotation of said crank means.

10. A device as in claim 6 wherein said contact-breaking means comprises rack means; means connected between said rack means and each of said two movable contact means; and pinion means rotated by said motor and cooperating with said rack means for urging said two movable contact means away from each other during a portion of the rotation of said pinion means.

* * * * *